United States Patent [19]

Graat et al.

[11] 4,255,115
[45] Mar. 10, 1981

[54] METHOD AND APPARATUS FOR PRODUCING A HOT GAS FLOW

[75] Inventors: Johannes W. Graat, Overasselt; Hans T. Remie, Nijmegen, both of Netherlands

[73] Assignee: Smit Ovens Nijmegan B.V., Nijmegen, Netherlands

[21] Appl. No.: 16,304

[22] Filed: Feb. 28, 1979

[30] Foreign Application Priority Data

Mar. 2, 1978 [DE] Fed. Rep. of Germany ....... 2808874

[51] Int. Cl.³ ............................. F23C 7/00; F23L 9/06
[52] U.S. Cl. ..................................... 431/10; 48/180 F; 60/737; 431/222; 431/352
[58] Field of Search .................... 431/8, 9, 10, 352; 48/180 F; 60/39.65; 432/222

[56] References Cited

U.S. PATENT DOCUMENTS

| | | | |
|---|---|---|---|
| 1,342,901 | 6/1920 | Good | 431/352 |
| 2,107,365 | 2/1938 | Brag | 432/222 |
| 2,933,296 | 4/1960 | Spangler | 432/222 |
| 3,870,456 | 3/1975 | Graat | 431/8 |
| 4,054,028 | 10/1977 | Kawaguchi | 431/10 |
| 4,173,118 | 11/1979 | Kawaguchi | 431/352 |

Primary Examiner—George E. Lowrance
Attorney, Agent, or Firm—Cushman, Darby & Cushman

[57] ABSTRACT

A method of producing a hot gas flow by combustion of preferably liquid fuels, by the following steps:
(a) atomizing the liquid fuel to form fine particles;
(b) further atomizing the thus generated fuel particles with the aid of combustion air supplied as atomizing medium, and reducing the mean fuel particle diameter to less than one-half of the mean diameter obtained in step (a);
(c) burning the fuel-air mixture within a flame cone extending on an axis A, under stoichiometric conditions or with an excess of oxygen within an air duct;
(d) introducing a stream of cold air to be heated or of another medium, optionally including components adapted to be oxidized, in a plane E extending substantially perpendicularly to axis A.

Further, the invention relates to a hot gas generator or incinerator for carrying out the method, comprising a straight air conducting pipe which has coaxially positioned therein a burner for liquid fuels, including a two-stage atomizing assembly for the liquid fuel. Several inlet apertures or ports open in the vicinity of the flame cone of the burner, said port serving to supply into said air conducting pipe, gaseous media, optionally containing oxidizable components.

18 Claims, 6 Drawing Figures

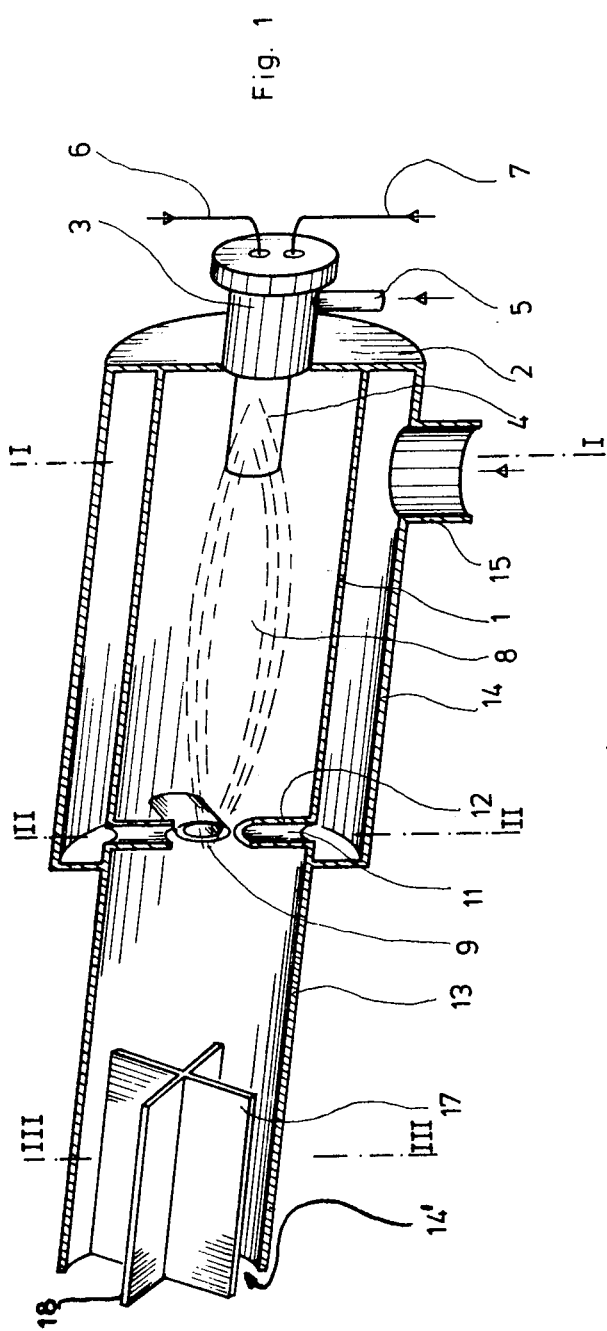
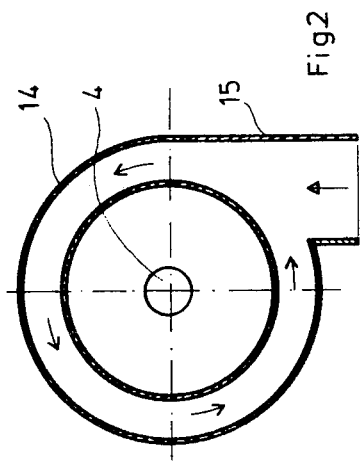
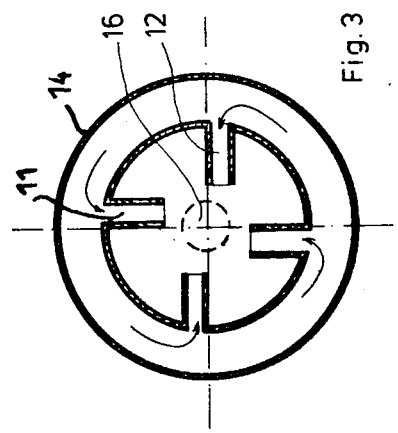
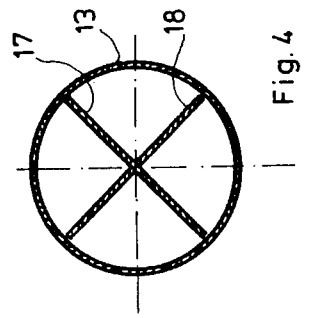

METHOD AND APPARATUS FOR PRODUCING A HOT GAS FLOW

The present invention relates to a method of producing a hot gas flow or stream by combustion of preferably liquid fuels, as well as to an apparatus for carrying out such method.

Hot gas generators wherein the medium to be heated, especially air, is directly heated, are employed in such instances where production methods or heat requirements exist which prohibit the direct application of a flame. A high degree of economy of the method should be obtained with a relatively low expenditure of apparatus elements. Hot gas generators of this type are primarily used in processing and drying techniques. The temperatures of the gases produced are generally within a range of from 100° to 500° C. for drying purposes and from 700° to 900° C. for the so-called calcining.

Whereas it is relatively easy to employ gas burners for the production of a hot gas flow, the use of burners operating with liquid fuels often involves difficulties. Owing to the incomplete combustion of liquid fuels, the hot gas produced has a relatively high content of carbon monoxide or soot. If additionally fuel in a gaseous state is entrained within the gas, spreading odorous substances may become a significant source of nuisance.

Furthermore, it is desirable in the operation of a hot gas generator to design the method applied and the apparatus employed in such a way that they may be used also for the combustion of substances capable of being oxidized. Such dual function offers the advantage that production (gas generation) may be rationalized and that application in operation is more versatile, combustion furnaces or incinerators are used for the afterburning of solvents, decomposition and roasting products, waste materials of refining plants and the like. The combustion heat generated may be recovered by corresponding heat exchangers.

Accordingly, it is the object of the present invention to provide a method of producing a hot gas flow suitable to operate an apparatus which may be operated as a hot gas generator and/or combustion furnace. Preferably, the apparatus should be adapted to be operated with liquid fuels and suitable to furnish a highly pure gas being free of CO and soot or carbon black (Bacharach Number=Zero) or free from fuel residues, respectively. The apparatus should lend itself to be constructed and operated economically and with a relatively low expenditure of means. Hereby, the efficiency should be adapted to be increased in that oxidizable substances, even waste materials, may be simultaneously burnt in a secondary system. In this way, it become perhaps possible to recover additional energy from oxidizable substances. The combustion chamber of the apparatus should be suitable to be constructed without a brick lining.

The above objects are solved in a method for producing a hot gas flow by combustion of liquid fuels, by carrying out the following method steps:

(a) atomizing the liquid fuel to form fine particles;

(b) further atomizing the thus generated fuel particles with the aid of combustion air supplied as atomizing medium, and reducing the mean fuel particle diameter to less than one-half of the mean diameter obtained in step (a);

(c) burning the fuel-air mixture within a flame cone extending on an axis A, under stoichiometric conditions or with an excess of oxygen within an air duct;

(d) introducing a stream of cold air to be heated or of another medium, optionally including components adapted to be oxidized, in a plane E extending substantially perpendicularly to axis A, within a portion of the flame cone which, by turbulence, residence time and temperature of the component(s) supplied, provides in the flame for sufficient heating and/or auxiliary combustion while avoiding as far as possible the production of harmful substances.

An essential requirement for carrying out the method is an extremely fine atomization of the fuel. Normally, fuel oils (diesel fuels) of classes EL or L are used as combustion fuels. However, fuels of a similar viscosity may be used, too, for instance even heavy fuel oils, provided that a corresponding disintegration of the fuel particles by heating and by high atomizing forces is possible. As a reference figure, it may be assumed that, when using fuel oil of class EL, the mean particle diameter during the initial atomization by means of commercially available atomizing nozzles is of the order of about 50 microns, and that this particle diameter is reduced to a mean diameter of from 5 to 10 microns ($\mu m$) in a further atomizing process which may be performed in one or two stages or steps.

In carrying out the present method, it is also of importance that the stream of the cold air to be heated or of the supplied medium, respectively, is introduced in a position relative to the flame cone where, on the one hand, this stream allows to be obtained as fast and as homogeneous as possible an intermixing with the hot combustion gases while, on the other hand, not preventing the optimum undisturbed combustion, because the above mentioned low values of the CO and soot contents could otherwise not be achieved. In the operation of a burner, it has been found to be particularly difficult to effect the mixing of a cold medium and a warm or hot medium. By means of the extremely fine atomization of the fuel and the injection of the cold media at predetermined positions, these problems may be solved in almost any instance.

If the method of producing hot gas is applied without any additional combustion of the gas to be heated, cold air is introduced in the region of the apex of the flame cone. Assuming that the air or the gas to be heated has a temperature of, for example, from −10° to +30° C., the cold medium no longer varies the equilibrum $CO$-$CO_2$-$H_2O$ at the apex of the flame cone, such that the present low CO values (e.g. 10 ppm) are not varied at all.

As a further measure, it is proposed to stabilize the mixture of air and fuel gas within a stabilizing path subsequent to the air conducting pipe to form a laminary or almost laminary flow. In this way, it is possible to achieve a local mixing effect which improves the temperature balance.

According to experience, optimum intermingling of the mutually perpendicular flows of hot and cold gases may be obtained if the mean velocity $w_H$ of the hot gas flow upon its exit from the stabilizing path corresponds to from 0.2 to 0.6 times the velocity $w_S$ of the cold air or medium introduced in plane E.

Still further, the present invention relates to an apparatus for carrying out the method outlined above. Basically, such apparatus is designed as a hot gas generator having the function of operating both with liquid and gaseous fuels. As is known to the expert, it is normally easier to operate a burner designed to burn liquid fluids, also with gas, whereas the inversed operation of a burner designed as a gas burner to consume oil is almost not possible at all. Although the burner described below operates preferably with liquid fuels, it may be operated as a gas burner, too.

Accordingly, the apparatus comprises a straight (linear) air conducting pipe (air duct) which has coaxially disposed therein a burner, preferably for liquid fuels, and including at least a two-stage atomizing assembly for the liquid fuel, said burner being adapted to produce a flame cone positioned on the axis of the air conducting pipe, with at least one port opening into the apparatus in the vicinity of the flame cone to introduce into the air conducting pipe a gaseous medium, optionally including oxidizable components, in the region of a plane E extending perpendicularly to the axis A of the flame cone. Owing to the addition of oxidizable components which may include gaseous, liquid or solid masses, the apparatus according to the invention, thus, may be used, surprisingly, also as a combustion furnace or incinerator.

At this point, reference may be made to the fact that the port(s) for the cold air to be heated may be disposed at various positions of the air conducting pipe. According to the invention, it has been found to be advantageous for use as hot gas generator that one or more ports are arranged in the vicinity of the apex of the flame cone in such a manner that this hot region having the greatest tendency to release heat, is blown through with fresh air in a particularly intense way.

If it is desired that the apparatus be used as a combustion furnace, the feed ports are arranged more towards the center of the flame cone.

Preferably, the apparatus has in one plane at least two ports or apertures, with the flow baffle means conducting the medium which exits from the ports to the periphery of a circle drawn around the axis A and having a diameter $D_i$ equal to $$D_s/1.2 \geq D_i \geq D_s/5$$

($D_s$ = diameter of the air conducting pipe).

This conducting of the cold medium, also termed tangential air conductance, results in a swirling motion that produces a good heat transfer. Advantageously, at said baffle means there are used short guide nozzles mounted to the inner wall of the air conducting pipe and covering the ports.

Still further, it is proposed that a stabilizing pipe is connected to the downstream end of the air conducting pipe, which stabilizing pipe encloses the so-called stabilizing path. Depending on the requirements imposed on the intermixing of the gas flow, such stabilizing pipe may be formed with different lengths and various configurations.

In order that the stabilizing pipe may readily fulfill its function, at least one air guiding or baffle element is mounted interiorly of the stabilizing pipe with its guiding surface being disposed substantially in parallel with axis A. It is preferable to design the air baffle elements as sheet metal plates with a cross-shaped section. The division of the inflowing stream into four quadrants have been found to be optimum as the flow helixes produced are quasi split up, and since initially, strong turbulence is created in each quadrant, which turbulence becomes laminary at the end of the stabilizing pipe. The local intermixing effect within each quadrant provides for rapid and complete temperature balance.

Under the aspect of minimum expenditure of apparatus elements, it has been found to be advantageous that the diameters of air conducting and stabilizing pipes are substantially equal, and that their lengths have a ratio v as follows:

$$1.2:1 \geq v \geq 1:0.3$$

It is further proposed that a hollow air conducting shell is provided coaxially around the air conducting pipe, which shell includes at least one inlet nozzle in the vicinity of the burner mouth and which terminates in the direction of axis A adjacent the inlet ports to feed these ports with cold air. This embodiment provides the advantage that, on the one hand, the air conducting pipe is cooled in the region of the flame, and, on the other hand, that the flame per se indirectly transfers part of its radiation and convection heat to the combustion air.

In order to provide as long as possible a transfer path with uniform feed across the full volume of the air conducting shell, it is preferable to have the air flow within the shell in the form of helixes. To this end, the inlet nozzle(s) is (are) mounted tangentially to the exterior wall of the shell.

Below, preferred embodiments of the present invention are shown in greater detail in the enclosed drawings, wherein:

FIG. 1 illustrates an apparatus according to the present invention, designed as a hot gas generator, in partially sectional and partially perspective view;

FIG. 2 is a sectional view along lines I—I of FIG. 1;

FIG. 3 is a sectional view along line II—II of FIG. 1;

FIG. 4 is a sectional view along lines III—III of FIG. 1;

Figure 5:
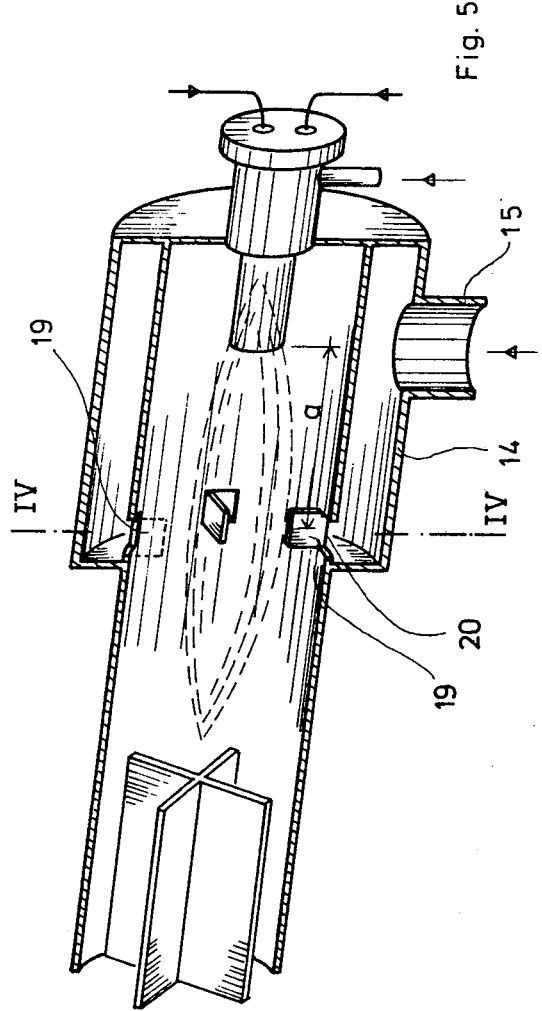
FIG. 5 illustrates an apparatus according to the invention, designed as a combustion furnace (incinerator)

The apparatus according to the present invention in its embodiment as a hot gas generator is provided with a straight air conducting pipe or air duct 1 which has its front end 2 partially closed and which supports a centered burner 3 having its jacket tube 4 extending into the interior of the air duct. The burner has mounted to its outer side an air supply pipe 5, and it includes supply pipes 6 for oil (or other liquid fuel) and for compressed air (pipe 7) in its end face. The burner shown is an atomizing burner operating with mechanical atomization of oil and with two-stage subsequent atomization with the aid of compressed air. Hereby, fuel particles are atomized to an extremely fine size. Preferably, a burner is used as is disclosed in the U.S. Pat. No. 3,870,456. However, other burners may be employed which may be operated with liquid fuels, such as fuel oil of class EL or other fuels.

The burner 3 produces a relatively short, stable flame forming a flame cone 8. Combustion takes place either under stoichiometric conditions or with an excess of oxygen. The flame cone is disposed around the axis A of the air duct. In the vicinity of the tip or apex 9 of the flame cone 8, short guide nozzles 12 covering ports 11 are placed onto the inner wall of the air duct 2. The function of the guide nozzles which have a diameter of 70 mm, will be explained below.

Following the air duct 1 in axial direction is a stabilizing pipe 13 having the same diameter as the air duct 1. Same as air duct 1, the stabilizing pipe 13 is of substantially cylindrical configuration. One bottom side 14' of this pipe is open and serves as an outlet for the heated gases produced within the hot gas generator. As to the dimensions of the hot gas generator, the air duct and the stabilizing pipe each have a length of about 800 mm, with the inner diameter of these pipe being about 300 mm. These values apply particularly if the air flow rate amounts to about 5,000 m³/h with the air being heated from 20° to 200° C.

The further structural details are explained in connection with the sectional views of FIGS. 2 to 4.

FIG. 2, showing a section along a plane including the jacket tube 4 of the burner, clearly illustrates that a coaxial, hollow air conducting shell 14 is arranged around the air duct 1. This shell 14 includes at least one inlet pipe or nozzle 15 in the region of the burner mouth and adapted to be fed with the cold air to be heated. The shell 14 which surrounds the air duct 1 substantially across the full length thereof, allows air to be passed up to the above mentioned guide nozzles 12. Through ports 11 which terminate interiorly of the shell 14, the air then flows inwards through guide nozzle 12, as can be seen particularly also from FIG. 3. The guide nozzle serves as air guiding or conducting means for cold air in order to cause the air exiting from the ports to flow to the periphery of a circle 16 drawn around the axis A and having a diameter $D_i$ corresponding to $$D_s/1.2 \geq D_i \geq D_s/5$$

($D_s$ = diameter of the air duct 1)

In the present embodiment, this circle has a diameter of 70 mm, while the air duct has a diameter of 300 mm.

Inlet nozzle 15 is mounted tangentially to the outer wall of the shell, such that a tangential flow is produced within the shell 14 to generate helixes formed by the inflowing cold air. The advantages of this embodiment have already been explained.

It is evident from FIG. 4, showing a sectional view of the stabilizing pipe 13, that a pair of baffle plates 17, 18 are disposed interiorly of the stabilizing pipe 13 with a cross-shaped cross-sectional configuration, which baffle plates extend across about one-half of the length of the stabilizing pipe 13. These baffle plates divide the initially, in the upstream portion of the stabilizing pipe, highly turbulent heated gases into four sections which are initially inherently turbulent and which are thereafter forceably converted into a laminary flow. To this end, the baffle surfaces of elements 17, 18 are arranged substantially in parallel with axis A.

Tests performed with the above-described hot gas generator have shown that a hot gas having an extremely constant temperature may be generated. With the use of the burner described and at a temperature of about 1000° C., variations of only ±5° C. have frequently been measured. Add to this that the generator can be operated not only at a predetermined, constant temperature; rather, the temperature may be varied within a range between 50° C. and 1300° C. by properly controlling the fuel and air supplies.

Normally, a single circle of guide nozzles 12 is provided. However, it is within the scope of the present invention to provide additional ports for medium to be fed in further levels or planes across the extension of the air duct and stabilizing pipe.

It is surprising that the hot gas generators can be fed not only with cold air, but may be used also in a direct process for the heating or drying of liquid substances, slurries and the like supplied through nozzles 12 or ports of similar configuration.

Reference is made to the fact that the medium which is termed "cold air" may include in addition to air, of course, also other gases, for instance inert combustion gases.

FIG. 5 illustrates the apparatus according to the invention in its embodiment as combustion furnace (incinerator). A mixture of air having contents of oxidizable substances, such as solvents, decomposition or roasting products or sulphur-containing products from refining processes, is fed into the apparatus through the inlet nozzle 15. Through passage 14, the medium passes to apertures or ports 20 provided with flow guiding vanes or plates 19, to flow into the center portion of the flame cone 8. In the latter, the medium is mixed with the hot flame gases, and the oxidizable substances are burnt. In this case, the place of introduction should be chosen such that turbulence, residence time and temperature of the component(s) fed permit a complete combustion to take place in the flame. Exemplary values for these conditions can be seen from the following Table:

| Substance; inlet temperature | Inlet distance+ | Temperature of flame after addition of substance |
|---|---|---|
| Air containing up to 1% of acetone, 20° C. | 0.3–0.6 | 800–1,200° C. |
| Exhaust air of a coffee roasting drum, 40° C. | 0.2–0.4 | 1,000–1,400° C. |
| Exhaust air form fish meal production, 25° C. | 0.5–0.7 | 700–1,000° C. |

+as measured across distance a from the edge of the shell pipe, based upon total length of flame = 1; compare FIG. 5.

The requisite residence time varies greatly for the substances specified, depending on particle and molecule size and on the efficiency of combustion required. This time is within the range of from 10 milliseconds and 2 seconds. According to the invention, the apparatus may be designed in a manner that the residence time may be set within the requisite limits.

Figure 6:
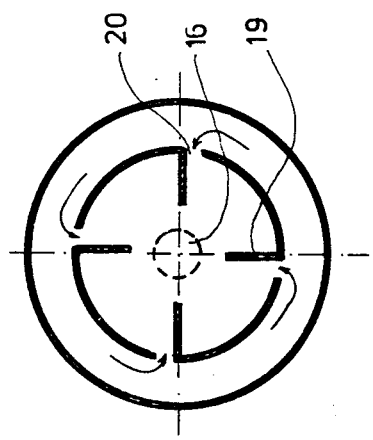
FIG. 6 is a sectional view of the air supply means along lines IV—IV of FIG. 5.

FIG. 6 shows a sectional view along lines IV—IV. As shown, in the place of the guide nozzles 12 according to FIG. 1, short baffle plates 19 are provided which act to pass the cold air entering through ports 20 to the periphery of an imaginary circle 16, in a manner that has been explained in connection with the guide nozzles. It is possible to use the specially shaped ports also in hot gas generators, same as it is possible to employ the above-described nozzles in the embodiment as combustion furnace or incinerator.

By arranging feed ports in a plurality of levels with respect to the flame, it is possible to use the apparatus, with corresponding closure means within the shell 14, both as a hot gas generator and as a combustion furnace.

What we claim is:

1. A method of producing a hot gas flow by combustion of preferably liquid fuels, characterized by the following steps:
    (a) atomizing the liquid fuel to form fine particles;
    (b) further atomizing the thus generated fuel particles with the aid of combustion air supplied as atomizing medium, and reducing the mean fuel particle diameter to less than one-half of the mean diameter obtained in step (a);

(c) burning the fuel-air mixture within a flame cone extending on an axis A, under stoichiometric conditions or with an excess of oxygen within an air duct;

(d) introducing a stream of a gaseous medium, in a plane E extending through said flame cone substantially perpendicularly to axis A, within a portion of the flame cone which, by turbulence, residence time and temperature of said medium, provides in the flame for sufficient heating which avoiding as far as possible the production of harmful substances.

2. The method according to claim 1, characterized in that in the case of generating hot gas, the gas to be heated is added in the region of the apex of the flame cone without auxiliary combustion.

3. The method according to claim 1, characterized by the following extra step:

(e) stabilizing the mixture of air and combustion gases within a stabilizing path following the air duct, to form a substantially laminary flow.

4. The method according to claim 1, characterized in that said air duct is cooled by the stream of gas to be heated in the region of the flame cone.

5. The method according to claim 3, characterized in that the mean velocity $w_H$ of the hot gas flow upon its exit from the stabilizing path is in the range defined by from 0.2 to 0.6 times the velocity $w_S$ of the cold air entering in plane E.

6. A hot gas generator or incinerator for producing a hot gas flow by combustion of liquid fuels, comprising a straight air conducting pipe having an axis A, which has coaxially positioned therein a burner for liquid fuels, including at least a two-stage atomizing assembly for the liquid fuel, which burner is adapted to produce a flame cone disposed on said axis A of said air conducting pipe, wherein said air duct has at least one inlet port means (11) opening in the vicinity of said flame cone (8), for supplying into said flame cone, gaseous media in a plane E extending through said flame cone perpendicularly to said axis A of said flame cone.

7. The apparatus according to claim 6, characterized in that said gaseous media comprises cold air to be heated, said port means including at least one port (11) for injecting cold air to be heated into the region of the apex (9) of said flame cone (8), said plane E passing through flame cone in the region of said apex.

8. The apparatus according to claim 6, characterized in that at least two ports (11) are provided in the same plane E for the medium introduced, with air baffle means (12) serving to pass the gaseous media exiting from said ports (11) to the periphery of a circle (16) drawn around the axis A and having a diameter $D_i$ corresponding to:

$$D_s/1.2 \geq D_i \geq D_s/5$$

($D_s$ = diameter of air duct 1).

9. The apparatus according to claim 8, characterized in that said air baffle means include short guide nozzles (12) covering said ports (11) mounted to said inner wall of said air conducting pipe (1).

10. Apparatus according to claim 6, characterized in that said air conducting pipe has associated therewith a downstream pipe (13) for stabilizing air and combustion gases to form a substantially laminant flow.

11. The apparatus according to claim 10, further comprising at least one air baffle element (17) having its guiding or baffle surface extending in parallel with said axis A mounted interiorly of said stabilizing pipe (13).

12. The apparatus according to claim 6, characterized in that the diameters of said air conducting and stabilizing pipes are substantially equal, and that their lengths are related to each other in the ratio v:

$$1.2:1 \leq v \leq 1:0.3$$

13. The apparatus according to claim 6, further comprising a hollow air conducting shell (14) arranged in coaxial relation around said air conducting pipe (1) so that cold air in said shell cools said conducting pipe, said shell having at least one inlet nozzle (15) adjacent to the burner mouth and terminating in the direction of axis A in the vicinity of said inlet port means (11) to feed the latter with cold air.

14. The apparatus according to claim 13, characterized in that said at least one inlet nozzle (15) is mounted in tangential disposition to the outer wall of said shell.

15. A method as in claim 1 wherein said medium includes oxidizable components, said step of introducing providing for auxilliary combustion of said oxidizable components.

16. A method as in claim 1 or claim 15 wherein said medium comprises cold air.

17. An apparatus as in claim 6 wherein said gaseous media contains oxidizable components.

18. An apparatus as in claim 8 wherein diameter D, is $D_i$ approximately equal to $D_s/5$.

* * * * *